(12) United States Patent
Allen et al.

(10) Patent No.: US 10,674,470 B1
(45) Date of Patent: Jun. 2, 2020

(54) SYSTEMS AND METHODS FOR PROVIDING MOBILE NETWORK SERVICES

(71) Applicant: T-Mobile USA, Inc., Bellevue, WA (US)

(72) Inventors: Mark Daniel Allen, Issaquah, WA (US); Prakasa Bellam, Snohomish, WA (US); Chakravarthi Japa, Bellevue, WA (US); Mehul Shah, Sammamish, WA (US); Mikhail Fridman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/526,110

(22) Filed: Jul. 30, 2019

(51) Int. Cl.
| | |
|---|---|
| *H04W 4/00* | (2018.01) |
| *H04W 60/04* | (2009.01) |
| *H04W 8/04* | (2009.01) |
| *H04W 8/18* | (2009.01) |
| *H04W 8/26* | (2009.01) |
| *H04W 8/22* | (2009.01) |
| *H04W 48/18* | (2009.01) |
| *H04W 48/00* | (2009.01) |
| *H04W 60/02* | (2009.01) |

(52) U.S. Cl.
CPC ............. *H04W 60/04* (2013.01); *H04W 8/04* (2013.01); *H04W 8/18* (2013.01); *H04W 8/22* (2013.01); *H04W 8/265* (2013.01); *H04W 48/17* (2013.01); *H04W 48/18* (2013.01); *H04W 60/02* (2013.01)

(58) Field of Classification Search
CPC ....... H04W 60/04; H04W 8/22; H04W 8/265; H04W 48/18; H04W 8/04; H04W 60/02; H04W 48/17; H04W 8/18
USPC ...................................................... 455/435.1
See application file for complete search history.

(56) References Cited

U.S. PATENT DOCUMENTS

| | | | | |
|---|---|---|---|---|
| 8,634,788 | B2 * | 1/2014 | Wright | H04W 4/029 455/238.1 |
| 9,094,533 | B2 * | 7/2015 | Geyer | H04W 4/029 |
| 9,916,583 | B2 * | 3/2018 | Hammad | G06Q 20/202 |
| 2005/0234864 | A1 * | 10/2005 | Shapiro | G06F 16/176 |
| 2019/0253931 | A1 * | 8/2019 | Xin | H04W 24/02 |

* cited by examiner

*Primary Examiner* — Amancio Gonzalez
(74) *Attorney, Agent, or Firm* — Lee & Hayes, P.C.

(57) ABSTRACT

Systems and methods for providing mobile network services are described herein. The systems and methods enable a user to register an endpoint for use on a mobile network. When registered on the mobile network, the endpoint can be used for mobile network services, such as placing or receiving audio/video calls.

20 Claims, 7 Drawing Sheets

SYSTEMS AND METHODS FOR PROVIDING MOBILE NETWORK SERVICES

BACKGROUND

Devices, or endpoints, powered by voice assistants are becoming ubiquitous in home and work environments. These devices typically, through a local wired/wireless connection or wired/wireless Internet connect, are controlled audibly to provide various functionality. These devices receive voice commands such as "increase the temperature," "set an alarm," or "turn on fan." Because these devices often are capable of receiving voice commands and outputting audio using speakers and video using a display, manufacturers have started to integrate these devices into communication systems so that users can place audio/video calls to third parties using these devices.

However, the communication networks used to connect the devices to the third parties is often disjointed and can be cumbersome both for the third-party system that controls the device as well as the third-party that receives the call. For example, the identification of the person making the call using an endpoint is often associated with the device manufacturer's "ecosystem" or user profile, and not any particular communication network. That means that often, when receiving a call placed using one of these devices, the recipient's phone will display "unknown caller." Further, because the device manufacturer's system is typically not associated with any communication network, certain features, such as emergency calls (911), international long distance (ILD), and informational calls (411), are often not supported.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
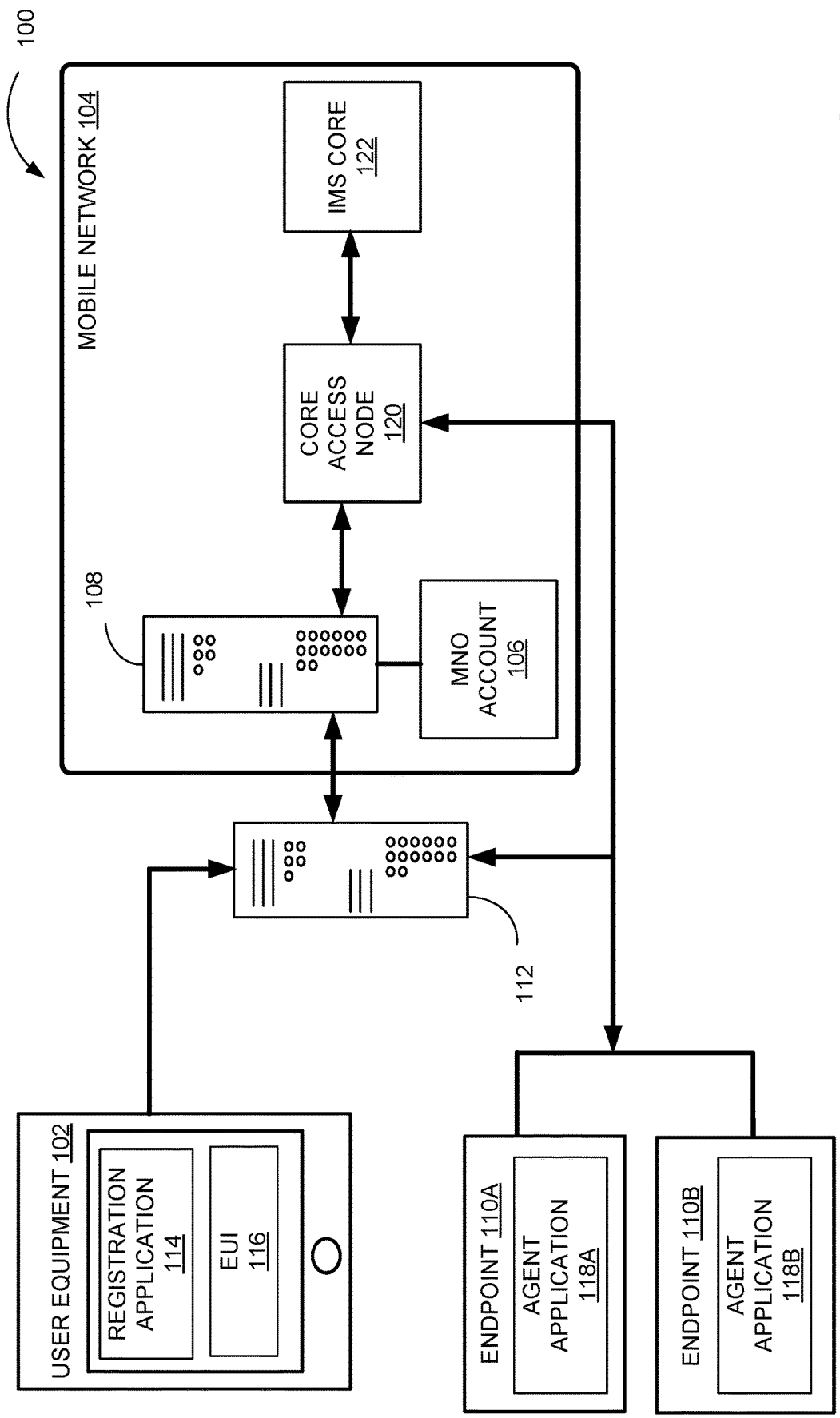
FIG. 1 depicts a system for providing mobile network services, in accordance with some examples of the present disclosure.

Examples of the present disclosure can comprise systems and methods for providing mobile network services to an endpoint. As used herein, an "endpoint" is a device provided by a third-party to a mobile network operator (MNO) and used primarily as a hub or device that receives commands to control other devices. An example of an endpoint is the HOME HUB or NEST HUB provided by GOOGLE.

In some examples of the presently disclosed subject matter, the endpoints provided by a third-party are authenticated and registered as a communication device with the MNO. The registration extends services provided by the MNO to the endpoint device. When authenticated and registered, the endpoint can access and be used on the network provided by the MNO.

To authenticate and register, an agent application is installed on the endpoint device. The agent application is used to allow the endpoint to communicate with a core access node of the network and to facilitate the authentication and registration of the endpoint device on the network. The core access node is a virtualized node of an Internet Protocol Multimedia Subsystem (IMS) core of the network provided by the MNO. The IMS core provides the handling of Session Initiation Protocol (SIP) traffic. The core access node is instantiated for the purpose of providing access for endpoints to the network.

In some examples, a user accesses a registration application provided by the MNO to register one or more endpoints on the network. The user logs into the account using an entity user interface (EUI) provided by the registration application. After receiving login credentials entered by the user, the credentials are provided to an Identity and Access Management (IAM) server of the MNO. The IAM server authenticates and informs an access server of the third-party associated with the endpoint that the authentication is valid. The access server informs the IAM server that the authentication message has been received and to provide an access token. The access token is a communication that is used to determine if the endpoint has been authenticated and registered and, if so, if the authentication and registration is still valid.

The IAM server provides the access server with a list of lines available for the endpoint, the lines being the telephone lines associated with the user account of the user registering the endpoint. As used herein, the telephone lines associated with the user account available for use by a third-party device are telephone numbers assigned to the user account as part of a user subscription to the services of the mobile network. For example, a user may subscribe to the services of a mobile network for three (3) telephone lines. The 3 telephone lines may be used by the user on one or more mobile devices. The user selects which lines to register for use with the endpoint along with the original, mobile device if the selected line is also used with a mobile device as part of the user's subscription to the services of the mobile network. The selected lines are provided to the access server, and thereafter, to the agent application on the endpoint. After the network finalizes the registration process, the endpoint can be used as a communication device associated with the selected line(s) of the network.

The systems and methods discussed herein are discussed generally with respect to cellular UEs, tablets, computers, and the like, and in terms of components (e.g., network entities) associated with Wi-Fi networks, Bluetooth networks, wired networks, fourth-generation (4G) and fifth-generation (5G) cellular networks, and other types of networks. The systems and methods can be used with other types of equipment and on other types of networks, however, where users may wish to have increased flexibility in sending and receiving calls, video calls, and messages. Thus, the systems and methods described herein are described in terms of the 4G and 5G networks merely because these networks represent the state of the current art. One of skill in the art will recognize, however, the systems and methods could also be used on other networks that provide video calling such as, for example, Internet of Things (IoT), machine-to-machine (M2M), sixth-generation (6G), and other current and future networks.

As shown in FIG. 1, examples of the present disclosure can comprise a system 100 to provide mobile network services. The system 100 includes a user equipment (UE) 102. THE UE 102 is used by a user to access and use the services of a mobile network 104. When a user subscribes to the services of the MNO that provides the mobile network 104, the user will create an MNO account 106. The MNO account 106 will include information about the user such as, but not limited to, login in information (such as username and password), cellular lines (or numbers) associated with the MNO account 106 and part of a user's subscription to the services of the mobile network 104 and assigned to one or more mobile devices of the user's subscription, and various permissions or settings associated with the use of the lines of the MNO account 106. The MNO account 106 is accessed by an Identity and Access Management (IAM) server 108 of the mobile network 104. Among other services, the IAM server 108 receives login information and determines if the login information is accurate, authenticating the user logging in.

FIG. 1 also includes endpoints 110A and 110B. The endpoints 110A and 110B may be various types of endpoints. For example, the endpoint 110A may be a hub device designed to receive voice commands from a user to control an appliance, such as an air conditioner or a fan. In another example, the endpoint 110B may be a video-enabled conferencing system that uses the communication network of the company providing the endpoint 110B to make and receive voice/video calls. The presently disclosed subject matter is not limited to any particular type, number, or combination of endpoint.

During normal use, the endpoints 110A and 110B communicate with third-party server 112. The third-party server 112 is a communication server provided to allow the endpoints 110A and 110B to communicate with outside devices. It should be noted that local networks such as home Wi-Fi® or Bluetooth® networks are not shown. In some examples, the endpoints 110A and 110B use a router (not shown) to connect to the Internet, providing the communication path to the third-party server 112.

In some examples, the user may desire to use either the endpoint 110A or the endpoint 110B, or both, as a communication device associated with MNO account 106 of the user rather than using the communication network services of the third-party that provides the endpoint 110A and/or the endpoint 110B. To use the endpoint 110A as a communication device associated with the MNO account 106, the endpoint 110A must be registered and associated with one or more lines of the MNO account 106. To provide for the registration of the endpoint 110A, the UE 102 has a registration application 114. The registration application 114 is configured to provide for the communication between the UE 102 and the third-party server. Once initiated, the registration application 114 instantiates an entity user interface (EUI) 116. The EUI 116 is an interface used by the user to input credentials to verify the user with the third-party server 112.

The third-party server 112 receives the credentialing information from the registration application 114 and accesses the IAM server 108 to verify the credentialing information submitted by the user. The IAM server 108 accesses the MNO account 106 and compares the credentialing information submitted by the user to the information stored in the MNO account 106. If the credentialing information submitted by the user is accurate or correct, the IAM server 108 notifies the third-party server that the credentialing information submitted by the user is correct.

Pursuant to verifying the credentialing information submitted by the user, the IAM server 108 accesses the MNO account 106 to retrieve a list of lines (or telephone numbers) associated with the MNO account 106. The IAM server 108 transmits this information to the third-party server 112, which is in turn provided to the user through the EUI 116. A user then selects the one or more lines to register with the endpoint 110A so that the endpoint 110A can be used as a communication device on the mobile network 104. The selected lines are provided to the third-party server 112. It should be noted that although the endpoint 110A may be used with the communication network provided by the third-party, the registration of the endpoint 110A on the mobile network 104 may cause certain functions, like voice or video calls, to use the mobile network 104 rather than, or in preference to, the third-party communication network.

Once a selection of the lines has been received at the third-party server 112, the third-party server 112 begins the configuration process on the endpoints 110A and 110B. Installed on the endpoints 110A and 110B are agent applications 118A and 118B, respectively. The agent applications 118A and 118B are applications executing on the endpoints 110A and 110B, respectively, that modify the operation of the endpoints 110A and 110B pursuant to a registration operation. The agent applications 118A and 118B may be provided by the MNO of the mobile network 104 or another entity. The agent applications 118A and 118B typically execute as a background operation on the endpoints 110A and 110B, may be operated in various manners. As noted above, the agent applications 118A and/or 118B receive a communication from the third-party server 112 to modify the operation of the agent applications 118A and/or 118B.

Once modified, in operations such as voice or video calling, the endpoints 110A and/or 110B will establish a communication pathway to a core access node 120 of the mobile network 104. In this manner, rather than using the third-party server 112 as the interface to the third-party's communication network, because of the modification caused by the agent applications 118A and 118B, the endpoints 110A and 110B will communicate with the core access node 120.

The core access node 120 is a virtualized node of an Internet Protocol Multimedia Subsystem (IMS) core 122 of the mobile network 104. The IMS core 122 provides the handling of Session Initiation Protocol (SIP) traffic. The core access node 120 is instantiated for the purpose of providing specialized access for endpoints 110A and 110B to the network. It should be noted that the agent applications 118A and/or 118B may be configured to cause the endpoints 110A and 110B to communicate with the IMS core 122 rather than the core access node 120. In some examples, using the core access node 120 can help maintain a degree of separation between devices that in a default or original configuration communicate using the IMS core 122, such as the user equipment 102, to devices that have to be reconfigured to communicate using the mobile network 104, such as the endpoints 110A and 110B. As explained in further detail in FIGS. 2, 3, and 4, the core access node 120 can validate, using tokens, the registration of the endpoints 110A and 110B for use on the mobile network 104.

FIGS. 2-5 are example message flow diagrams illustrating the initial authentication and registration process of the endpoint 110A in the system of FIG. 1, in accordance with some examples of the present disclosure.

Figure 2:
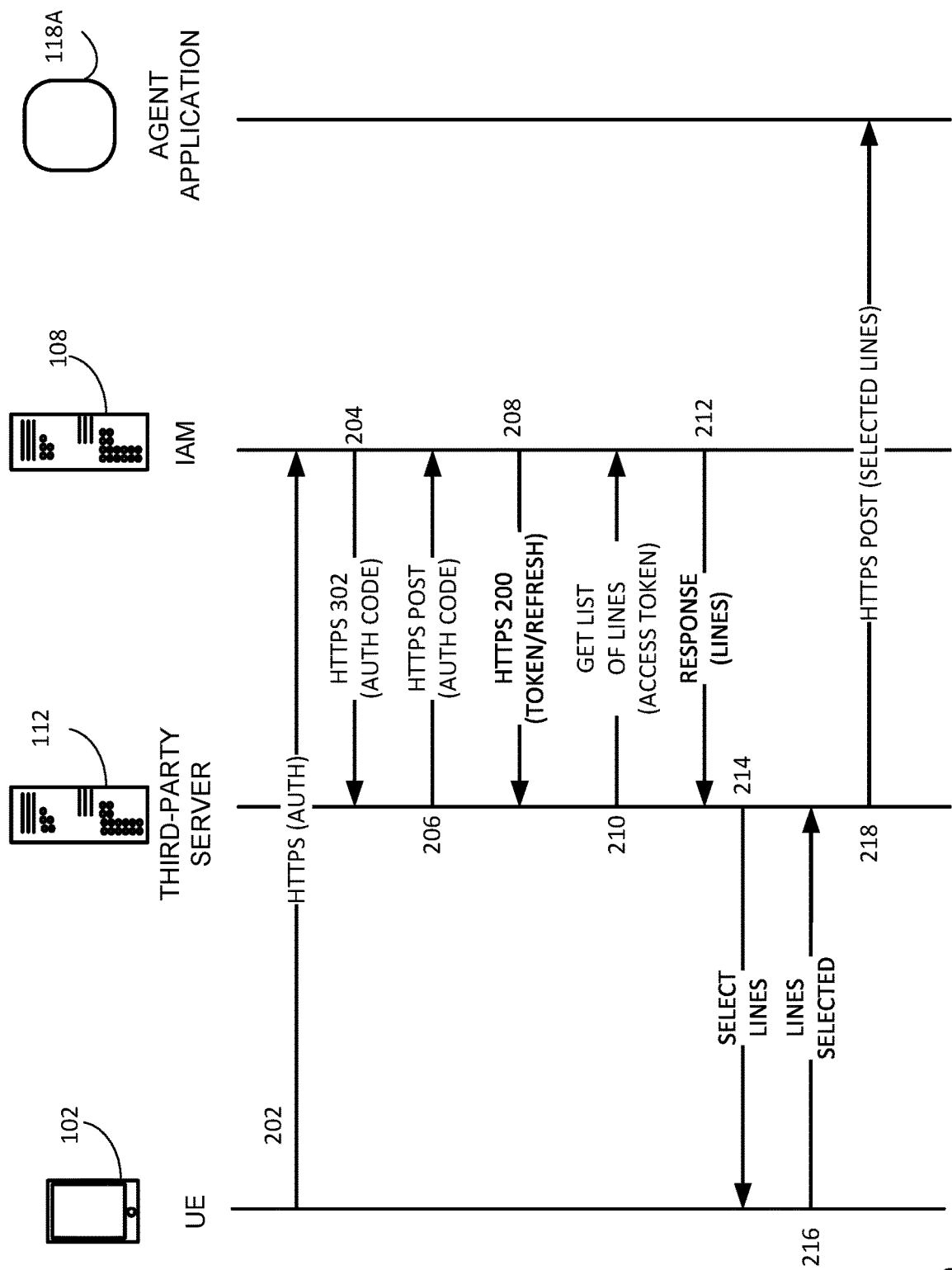
FIGS. 2-5 are example message flow diagrams illustrating the initial authentication and registration process of an endpoint, in accordance with some examples of the present disclosure.

In FIG. 2, at 202, a Hypertext Transfer Protocol (HTTP) over Secure Socket Layer (HTTPS) authentication communication is transmitted from the UE 102 to the IAM SERVER 108. The authentication communication is sent pursuant to a login attempt made by a user by entering information into the EUI 116 of the UE 102.

At 204, the IAM SERVER 108 sends an HTTPS 302 authentication code to third-party server 112. The authentication code is a communication indicating that the IAM SERVER 108 has authenticated the login credentials received at 202. At 206, the third-party server 112 sends an HTTPS POST communication indicating that the authentication has been received and to continue with the registration process.

At 208, the IAM SERVER 108 transmits an HTTPS 200 token/refresh token communication to the third-party server 112. As used herein, a token is a software security mechanism used to authorize the use of the endpoint 110A on the mobile network 104. If the token is active or authentic, the endpoint 110A may be used on the mobile network 104. The token can have a time limit or duration in which a token refresh is required to maintain the operation of the endpoint 110A on the mobile network 104 (described in more detail below).

At 210, the third-party server 112 requests a list of lines that the endpoint 110A is to be used with. The list of lines are one or more phone numbers, or other unique information, that are assigned and permitted for use by the user that entered the login credentials at 202.

At 212, the list of lines is provided by the IAM SERVER 108. The IAM SERVER 108 can access user records to determine the lines that the user has available for use pursuant to their subscription. It should be noted that the list of lines may include all lines available for use, one line of a plurality of lines available for use, or one or more previously identified lines. For example, a user may have four numbers associated with their account, one for them and the three for his or her family members. However, the user may only want one of the lines to be useable for devices other than the mobile devices associated with each line. In that example, the IAM SERVER 108 may only be provided one or more lines that have been previously approved. Other configurations are possible and are considered to be within the scope of the presently disclosed subject matter.

At 214, the third-party server 214 transmits the identification of the lines to the UE 102. At 216, the UE 102 receives a selection of the line(s) and transmits the selected lines to the third-party server 112. At 216, the third-party server 218 transmits the selected lines to the agent application 118A on the endpoint 110A. Pursuant to 216, the agent application 118A executing on the endpoint 110A has been provided with the lines that are available for use.

Figure 3:
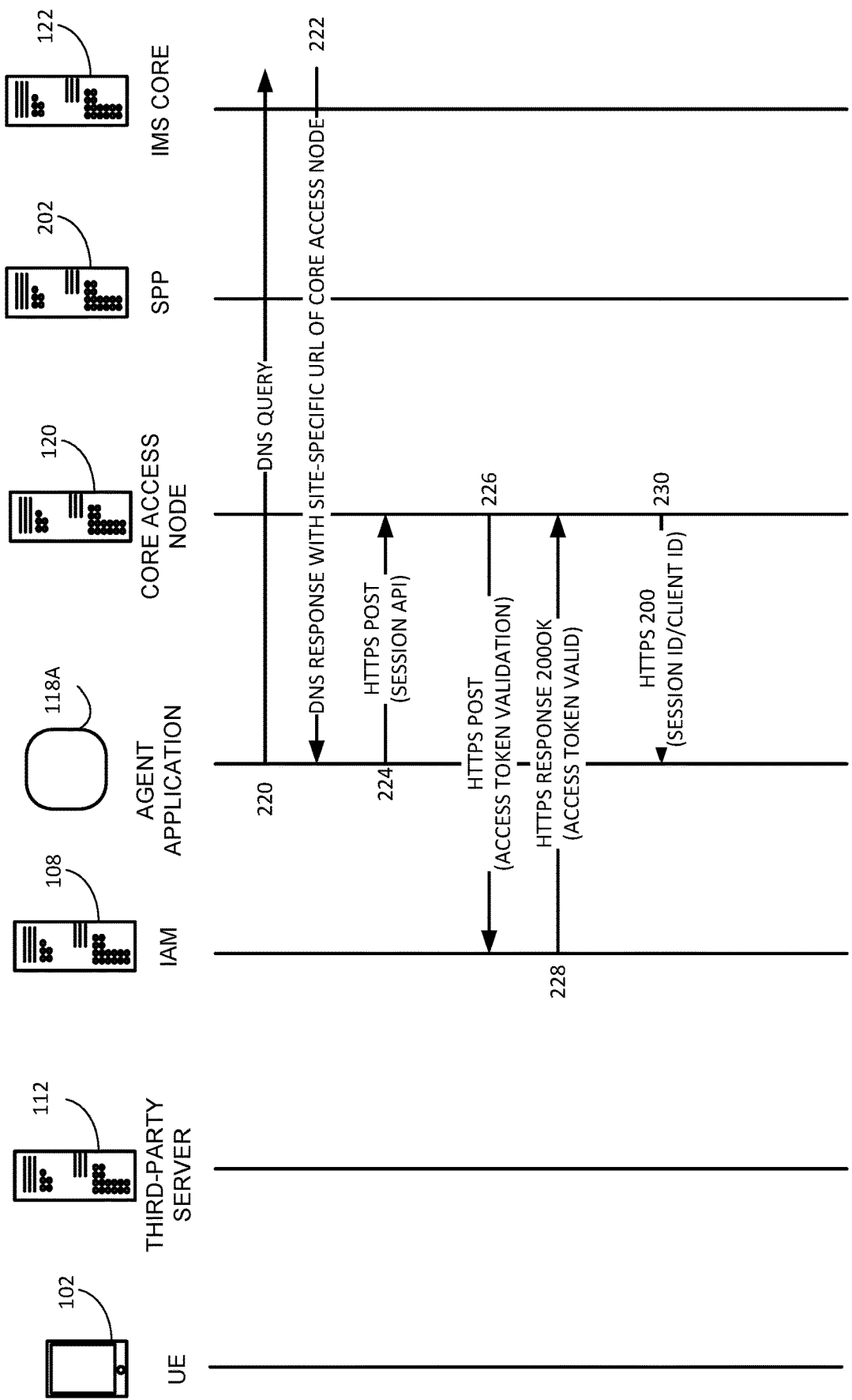

FIG. 3 is a message flow diagram that illustrates how the endpoint 110A is provided access to the core access node 120. As described above, the core access node 120 acts as an interface between the IMS core 122, which communicates in SIP, and the agent application 118A, which communicates in HTTPS (HTTP over SSL). In some examples, the IMS core 122 may be configured to only communicate using SIP. However, in some configurations, the IMS core 122 may be configured to communicate in HTTPS. In that example, some functions of the core access node may be transferred to or performed by the IMS core 122.

At 220, the agent application transmits a generic DNS query to a generic Fully Qualified Domain Name (FQDN). The DNS query is transmitted so that the agent application 118A can receive information from the mobile network 104 as to which core access node 120 to communicate with and the uniform resource locator (URL) of that core access node 120. At 222, in response to the generic DNS query of 220, the agent application 118A receives a specific FDQN or IP Address/URL and identity of the core access node 120 to communicate with.

At 224, the agent application 118A initiates a session application programming interface (API) with the core access node 120. In response to the session API message, at 226, the core access node 120 initiates an access token validation operation to determine if the agent application 118A has permission to open the session API.

At 228, the IAM SERVER 108 sends a message to the core access node 120 that indicates the access token is valid. At 230, the core access node 120 transmits a session identification and client identification to the agent application 118 to be used by the agent application 118A. The agent application 118A stores the client identification and the session identification and uses the identifications in subsequent APIs called to the core access node 120.

Figure 4:
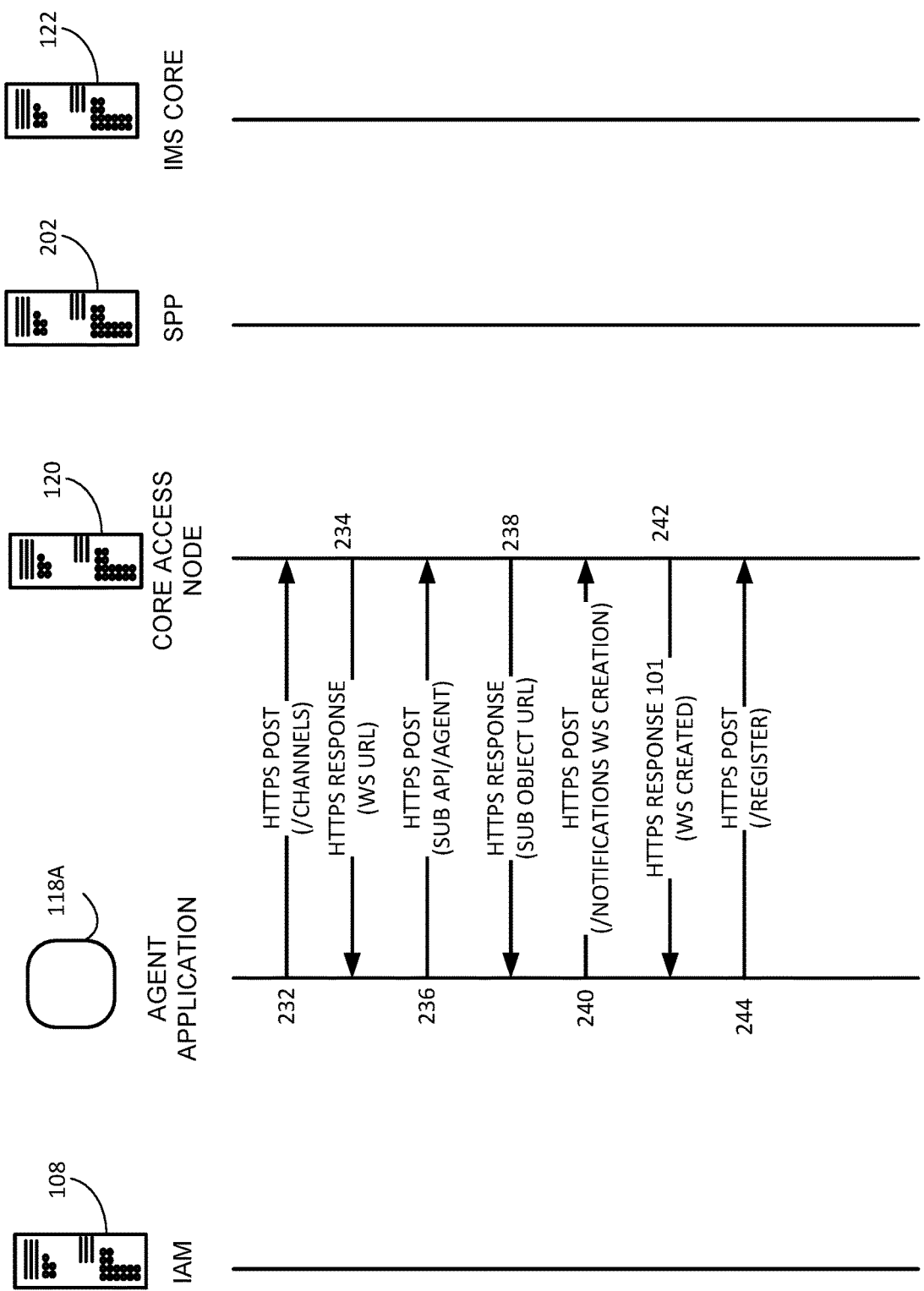

FIG. 4 is a message flow diagram illustrating the determination and selection of channels to establish a WebSocket (WS) for use by the agent application 118A. At 232, the agent application 118A sends an HTTPS POST (/channels) communication requesting available WS channels for use. At 234, the core access node responds with the WS URL.

At 236, the agent application 118A transmits an HTTPS POST communication, requesting a subscription to the available services for the selected lines. As part of the HTTPS POST communication at 236, or another earlier communication, the capabilities of the endpoint 110A are provided to the core access node 120. Capabilities include, but are not limited to, audio, video, audio/video, network communication capabilities (such as the ability to communicate using a mobile broadband line) and the like. Based on the information provided by the agent application 118A, the core access node 120 will only allow a subscription to appropriate services. For example, if the endpoint 110A only provides an audio input/output, the core access node 120 will only subscribe the endpoint 110A to audio services and not other services like video.

At 238, the core access node transmits an HTTPS RESPONSE message to the agent application 118 indicating the services the endpoint 110A is subscribed to. At 240, the agent application 118A transmits an HTTPS POST message to the core access node 120 to request the creation of the WS to which the agent application 118A uses to communicate. At 242, the core access node 120 transmits an HTTPS RESPONSE 101 indicating that the WS has been created. At 244, the agent application 118A transmits an HTTPS POST (/Register) indicating that the agent application 118A has completed its registration operation and is ready to use the WS.

In some examples, the core access node 120 maintains a timer that maintains the registration of the endpoint 110A for a certain period of time. In some examples, as explained below, the registration may be refreshed (e.g. the timer is reset) if the core access node 120 has received a communication from the agent application 118A to refresh the registration. In some examples, if the endpoint 110A is used for communication on the mobile network 104, the core access node 120 will automatically refresh the registration of the endpoint 110A. In some examples, the purpose of the timer is so that registrations of the endpoints, such as the endpoint 110A, are for active endpoints and not endpoints that have not been used for a certain period of time or are no longer in use (such as a faulty endpoint).

Figure 5:
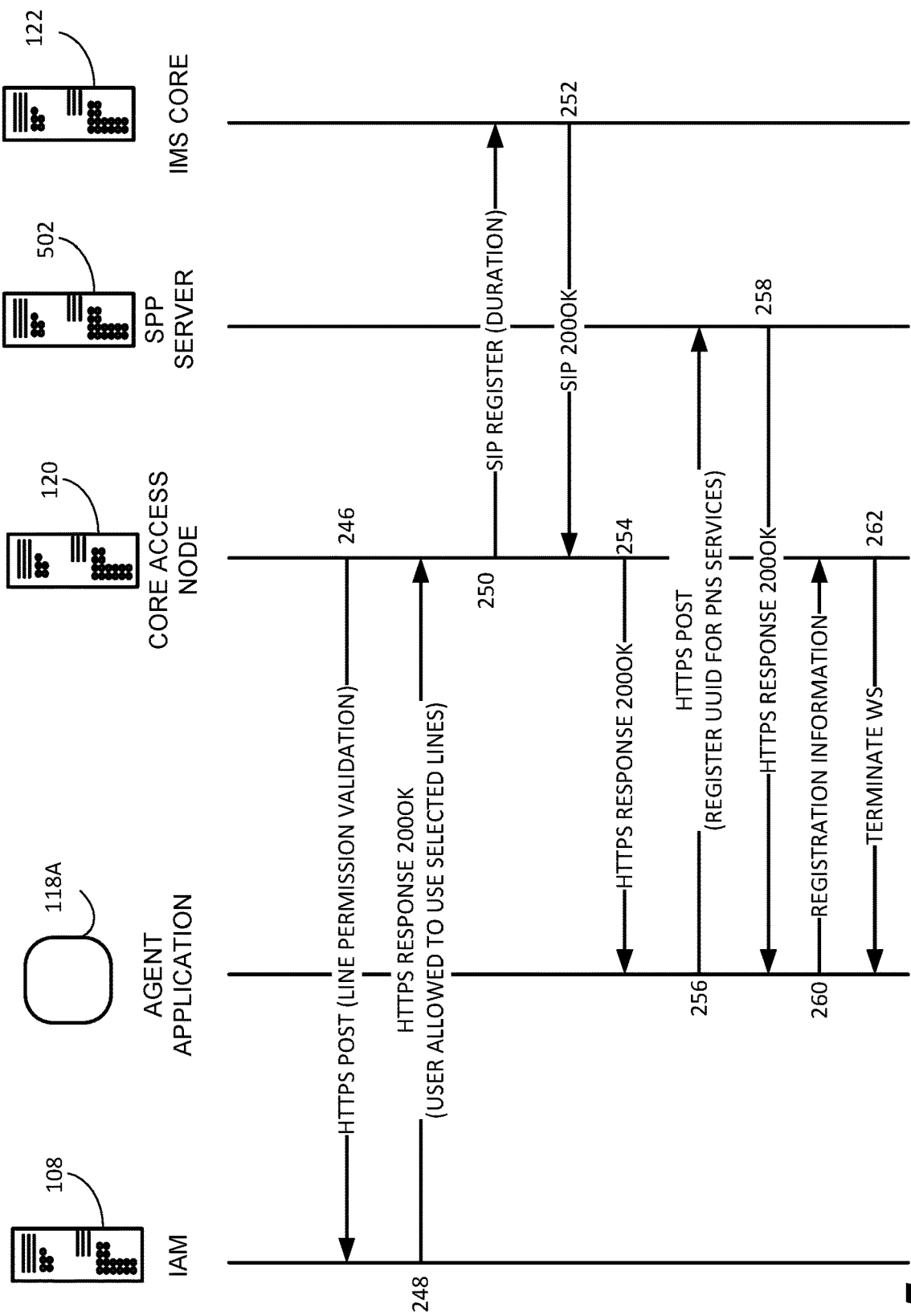

FIG. 5 is a message flow diagram continuing the registration process from FIG. 4. At 246, the core access node transmits an HTTPS POST message to the IAM SERVER 108 confirming lines that the user can use for the endpoint 110A. At 248, the IAM SERVER 108 transmits an HTTPS RESPONSE message indicating that user can use the lines. At 250, the core access node 120 transmits a SIP REGISTER message to the IMS core 122 indicating that the lines have been validated by the IAM SERVER 108 and that the endpoint 110A registration should be enacted for the registration period. At 252, the IMS core 122 transmits a SIP 200OK message to the core access node 120 indicating that registration is enacted, and the registration time has been set.

At 254, the core access node 120 transmits an HTTPS RESPONSE 200OK message to the agent application 118A on the endpoint 110A informing the agent application 118A that the registration process has been finalized by the IMS core 122 and that the agent application 118A can request access to push notification services (PNS).

At 256, the agent application transmits an HTTPS POST message to a Secure Push Proxy (SPP) server 502 requesting the registration of the endpoint 110A for PNS. SPP is a byte stream protocol that can be used to provide reliable, flow-controlled, two-way transmission of data. It should be understood that other protocols may be used and are considered to be within the scope of the presently disclosed subject matter. In one example, the Web Socket Protocol may be used in place or as a supplement to PNS.

In some examples, a universally unique identifier (UUID) is used to register the endpoint 110A. At 258, the SPP server 502 transmits an HTTPS RESPONSE 200OK message indicating that PNS is available for the agent application 118A. At 260, the agent application 118A transmits the PNS registration information to the core access node 120. At 262, the core access node 120 terminates the WS used for the registration process. In some examples, 262 may be optional if the agent application 118A is PNS capable or is only using WebSocket protocols. In some examples, the WebSocket can either remain open or be closed based on various requirements or limitations of the agent application.

The initial authentication and registration process thereafter ends, with the agent application 118A registered for use as a device on the mobile network 104 for the selected lines. Thus, a user can use the endpoint 110A to place and receive calls, video calls, and other mobile network 104 services (such as text and the like) as long as, for example, the timer of the IMS core 122 indicating an active registration has not expired.

Figure 6:
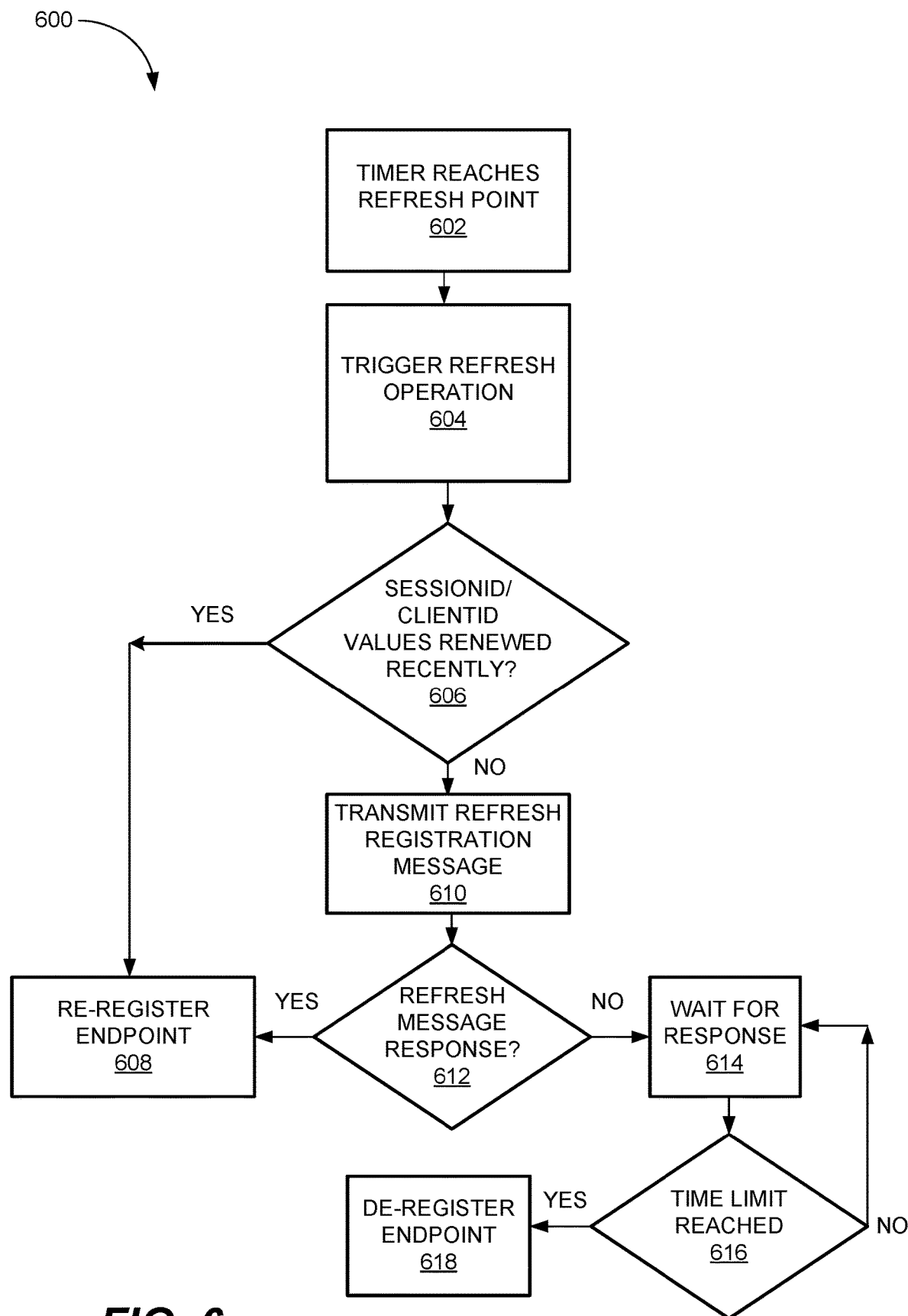
FIG. 6 is an illustrative process for refreshing the registration of an endpoint that was registered to use the services of the mobile network.

FIG. 6 is an illustrative process 600 for refreshing the registration of the endpoint 110A that was registered to use the services of the mobile network 104. The process and other processes described herein are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

As discussed above, it may be helpful to only maintain registrations of endpoint devices that are active. In some examples, if an endpoint registration was open ended (e.g. no expiration or duration limit), the list of registered endpoints could grow with outdated or unused endpoints, requiring more network resources than necessary. By requiring endpoints to be refreshed, the list of registered endpoints is continually updated.

Referring to FIG. 6, the process 600 commences at operation 602, where a timer reaches a refresh point. As noted above, in some configurations, the core access node 120 will keep an internal timer for IMS core 122 registration. The timer is used to maintain a current and active list of endpoints that are registered. The timer countdown time may vary, but if the registration period to be refreshed is seven (7) days, for example, the countdown timer may be six and one half (6.5) days long. The timer typically commences after the endpoint 110A is registered with the IMS core 122.

At operation 604, the refresh operation is triggered as a result of the timer reaching a refresh point.

At operation 606, the core access node 120 will check internally to determine if the sessionID/clientID values were recently renewed for the user, indicating that the endpoint 110A was recently used. The period of time may be a window of one or two days prior to the timer reaching the refresh point, though other windows may be used.

If the sessionID/clientID values were recently renewed for the user, the process 600 continues to operation 608, where the endpoint 110A is re-registered without contacting or interacting with the endpoint 110A or the third-party server 112.

If the sessionID/clientID values were not recently renewed for the user, the process 600 continues to operation 610, where a refresh registration message is transmitted. The core access node 120 transmits a refresh PNS message to the SPP server 502, which in turn transmits a refresh registration PNS message to the third-party server 112. The third-party server 112 transmits a refresh registration PNS message to the agent application 118A.

At operation 612, the core access node 120 will determine if a refresh message response is received from the third-party server 112. If a refresh message response is received, the process 600 continues to operation 608, where the registration of the endpoint 110A is renewed.

If a refresh message response is not received, the process 600 continues to operation 614, where the core access node will wait a period a time for the response. The process 600 continues to operation 616, where a determination is made as to whether or not a time limit has been reached to receive the refresh message response. If the time limit has not been reached, the process 600 continues to operation 614. If a refresh message response is received before the time limit, the process 600 continues to operation 608 and the registration of the endpoint 110A is refreshed. If the time limit is reached at operation 616, the process 600 continues to operation 618, where the endpoint 110A is de-registered. The process 600 ends thereafter ends after operation 608, where the endpoint 110A is re-registered (or the registration is refreshed), or, after operation 618, where the endpoint 110A is de-registered.

Figure 7:
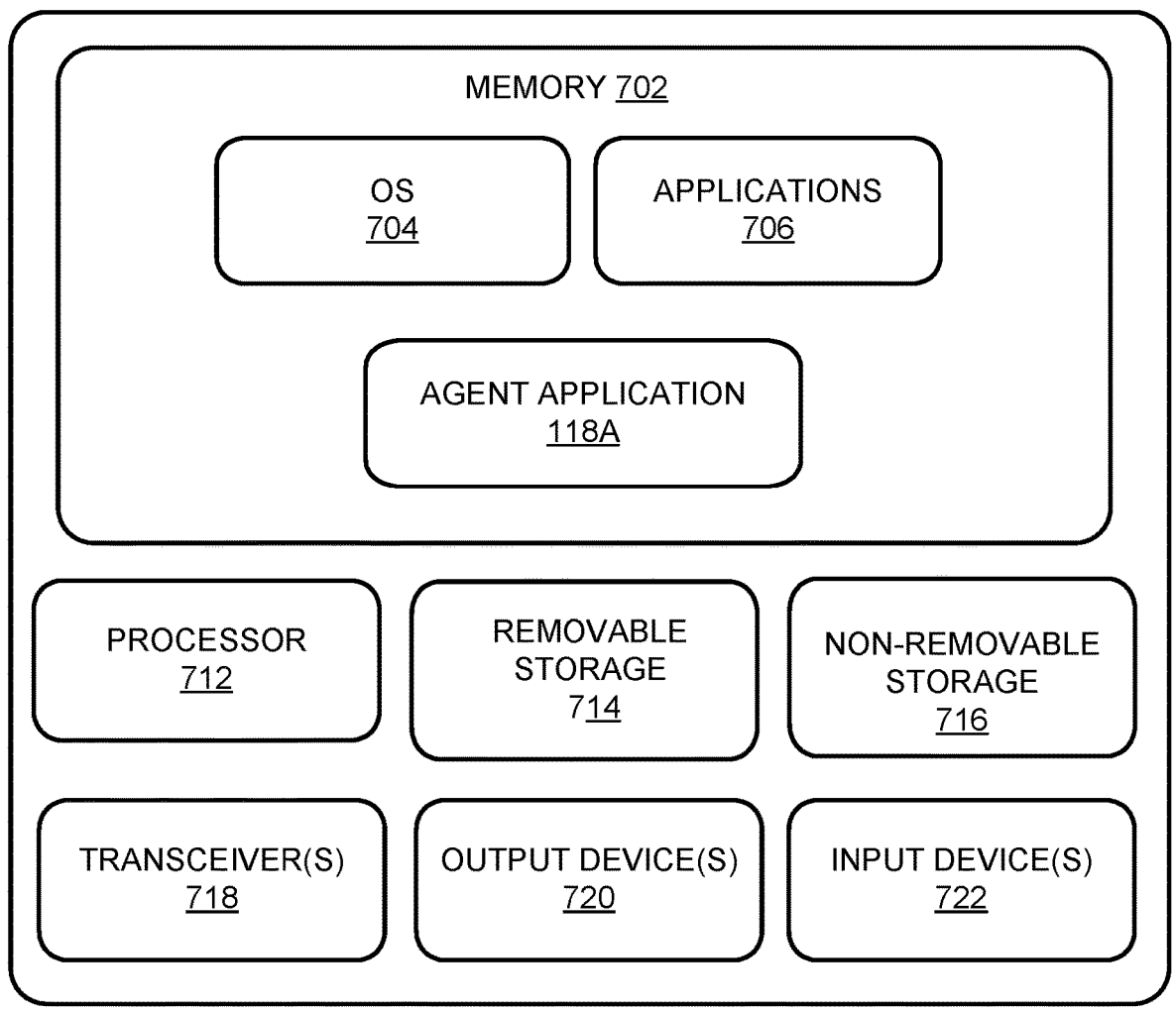
FIG. 7 depicts a component level view of an endpoint for use with the systems and methods described herein.

FIG. 7 depicts a component level view of the endpoint 110A for use with the systems and methods described herein. The endpoint 110A could be any device provided by a third-party to a mobile network operator capable of making audio and/or video calls on a cellular network, an internet multimedia subsystem, and/or an IP network.

The endpoint 110A can comprise several components to execute the above-mentioned functions. As discussed below, the endpoint 110A can comprise memory 702 including an operating system (OS) 704 and one or more standard applications 706. The standard applications 706 can include many features common to endpoints such as, for example, applications initiated using voice commands (such as Internet searches, home appliance controls, and the like), music player, Internet radio, and other such applications. In this case, the standard applications 706 can also comprise a video call application, an audio call application, and a messaging application to enable users to engage in audio calls, video calls, and messaging, among other things, using the third-party server 112. The standard applications 706 can also include contacts to enable the user to select a contact to initiate, for example, a video call, audio call, text message, etc.

The endpoint 110A can also comprise the agent application 118A. As mentioned above, the agent application 118 can be an application provided by an MNO that allows the endpoint 110A to be configured to communicate using the mobile network 104 rather than the third-party server 112. In some examples, the agent application 118A operates in the background of the endpoint 110A, but other configurations are possible and are considered to be within the scope of the presently disclosed subject matter.

The endpoint 110A can also comprise one or more processors 712 and one or more of removable storage 714, non-removable storage 716, transceiver(s) 718, output device(s) 720, and input device(s) 722. In various implementations, the memory 702 can be volatile (such as random access memory (RAM)), non-volatile (such as read only memory (ROM), flash memory, etc.), or some combination of the two. The memory 702 can include all, or part, of the agent application 118A. In some examples, rather than being stored in the memory 702, some, or all, of the agent application 118A, and other information can be stored on a remote server or a cloud of servers accessible by the endpoint 110A.

The memory 702 can also include the OS 704. The OS 704 varies depending on the manufacturer of the endpoint 110A. The OS 704 contains the modules and software that support basic functions of the endpoint 110A, such as scheduling tasks, executing applications, and controlling peripherals. In some examples, the OS 704 can enable the agent application 118A, and provide other functions, as described above, via the transceiver(s) 718. The OS 704 can send information to the GUI 710, for example, to cause the GUI 710 to display video data if the endpoint 110A is capable of displaying video or images. The OS 704 can also receive inputs from the GUI 710 to cause the endpoint 110A to use the standard applications 706 for some functions, while other functions are handled in the agent application 118A, among other things. The OS 704 can also enable the endpoint 110A to send and retrieve other data and perform other functions using the agent application 118A.

The UE 102 can also comprise one or more processors 712. In some implementations, the processor(s) 712 can be a central processing unit (CPU), a graphics processing unit (GPU), both CPU and GPU, or any other processing unit. The endpoint 110A may also include additional data storage devices (removable and/or non-removable) such as, for example, magnetic disks, optical disks, or tape. Such additional storage is illustrated in FIG. 7 by removable storage 714 and non-removable storage 716.

Non-transitory computer-readable media may include volatile and nonvolatile, removable and non-removable tangible, physical media implemented in technology for storage of information, such as computer readable instructions, data structures, program modules, or other data. The memory 702, removable storage 714, and non-removable storage 716 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the endpoint 110A. Any such non-transitory computer-readable media may be part of the endpoint 110A or may be a separate database, databank, remote server, or cloud-based server.

In some implementations, the transceiver(s) 718 include any transceivers known in the art. In some examples, the transceiver(s) 718 can include wireless modem(s) to facilitate wireless connectivity with other components (e.g., between the endpoint 110A and a wireless modem that is a gateway to the Internet), the Internet, and/or an intranet. Specifically, the transceiver(s) 718 can include one or more transceivers that can enable the endpoint 110A to send and receive video calls, audio calls, and messages and to perform other functions. Thus, the transceiver(s) 718 can include multiple single-channel transceivers or a multi-frequency, multi-channel transceiver to enable the endpoint 110A to send and receive video calls, audio calls, messaging, etc. The transceiver(s) 718 can enable the endpoint 110A to connect to multiple networks including, but not limited to the 2G 202, 3G 204, 4G 206, 5G 208, and Wi-Fi networks. The transceiver(s) can also include one or more transceivers to enable the endpoint 110A to connect to future (e.g., 6G) networks, Internet-of-Things (IoT), machine-to machine (M2M), and other current and future networks.

The transceiver(s) 718 may also include one or more radio transceivers that perform the function of transmitting and receiving radio frequency communications via an antenna (e.g., Wi-Fi or Bluetooth®). In other examples, the transceiver(s) 718 may include wired communication components, such as a wired modem or Ethernet port, for communicating via one or more wired networks. The transceiver(s) 718 can enable the endpoint 110A to make audio and video calls, download files, access web applications, and provide other communications associated with the systems and methods, described above.

In some implementations, the output device(s) 720 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen, or display, on which the GUI 710 can be displayed. The output device(s) 720 can also include speakers, or similar devices, to play sounds or ringtones when an audio call or video call is received. Output device(s) 720 can also include ports for one or more peripheral devices, such as headphones, peripheral speakers, or a peripheral display.

In various implementations, input device(s) 722 include any input devices known in the art. For example, the input device(s) 722 may include a camera, a microphone, or a keyboard/keypad. The input device(s) 722 can include a touch-sensitive display or a keyboard to enable users to enter data and make requests and receive responses via web applications (e.g., in a web browser), make audio and video calls, and use the standard applications 706, among other things. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can be used to display the GUI 710, for example, and to act as both an input device 722 and an output device 720.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method, comprising:
   receiving a request from a user equipment to modify a third-party device for use on a mobile network;
   sending to the user equipment a list of one or more telephone lines associated with a user account available for use by the third-party device, each telephone line of the one or more telephone lines being a telephone line assigned to the user account as part of a user subscription to services of the mobile network;
   receiving a selection of at least one telephone line of the list of one or more telephone lines and a request to register the at least one telephone line;
   subscribing the third-party device to a mobile telephone service associated with the at least one telephone line the third-party device is capable of using; and
   validating a registration of the third-party device for the service subscribed to for a registration period.

2. The method of claim 1, further comprising:
   receiving a notification that a timer has reached a refresh point to refresh the registration of the third-party device prior to an end of the registration period; and
   triggering a refresh operation of the registration.

3. The method of claim 2, further comprising:
   determining that the third-party device has been used on the mobile network within a period of time prior to the timer reaching the refresh point; and
   in response to determining that the third-party device has been used on the mobile network within a period of time prior to the timer reaching the refresh point, automatically refreshing the registration of the third-party device and ending the refresh operation.

4. The method of claim 2, further comprising:
   determining that the third-party device has not been used on the mobile network within a period of time prior to the timer reaching the refresh point; and
   in response to determining that the third-party device has not been used on the mobile network within a period of time prior to the timer reaching the refresh point:
     transmitting a refresh registration message to the third-party device;
     waiting a period of time to receive a response from the third-party device in response to transmitting the refresh registration message to the third-party device;
     if the response from the third-party device in response to transmitting the refresh registration message to the third-party device is not received within a response time limit, de-registering the third-party device and ending the refresh operation; and
     if the response from the third-party device in response to transmitting the refresh registration message to the third-party device is received within a response time limit, re-registering the third-party device and ending the refresh operation.

5. The method of claim 1, further comprising:
   receiving a list of capabilities of the third-party device; and
   modifying the list of the one or more telephone lines based on the list of capabilities prior to sending the list of the one or more telephone lines for selection.

6. The method of claim 5, wherein the list of capabilities comprises audio capabilities, video capabilities, or network communication capabilities.

7. The method of claim 1, further comprising:
   installing an agent application on the third-party device; and
   transmitting to the agent application an identification to be used by the third-party device to communicate with the mobile network, wherein the identification comprises a clientID and a sessionID.

8. The method of claim 1, further comprising authenticating the request against a user account associated with the request.

9. A core access node of a mobile network, comprising:
   memory storing computer-executable instructions; and
   a processor in communication with at least the transceiver and the memory, the computer-executable instructions causing the processor to perform acts comprising:
     receiving request from an agent application installed on a third-party device to allow use of a third-party device on a mobile network by using at least one telephone line of a plurality of telephone lines assigned to a user account as part of a user subscription to the mobile network;
     receiving a validation message from the agent application that an access token is valid;
     transmitting an identification to the agent application, the identification to be used by the third-party device to communicate with the mobile network;
     subscribing the third-party device to a mobile telephone service associated with at least one telephone line of the plurality of telephone lines the third-party device is capable of using;
     validating a registration of the third-party device for the mobile telephone service subscribed to; and
     maintaining a registration timer that triggers a refresh operation to ensure the third-party device is active.

10. The core access node of the mobile network of claim 9, wherein the computer-executable instructions further comprise instructions to cause the processor to perform the acts comprising:
    receiving a notification that the registration timer has reached a refresh point to refresh the registration of the third-party device prior to an end of a registration period; and
    triggering the refresh operation of the registration.

11. The core access node of the mobile network of claim 10, wherein the computer-executable instructions further comprise instructions to cause the processor to perform the acts comprising:
    determining that the third-party device has been used on the mobile network within a period of time prior to the registration timer reaching the refresh point; and
    in response to determining that the third-party device has been used on the mobile network within a period of time prior to the registration timer reaching the refresh point, automatically refreshing the registration of the third-party device and ending the refresh operation.

12. The core access node of the mobile network of claim 11, wherein the computer-executable instructions further comprise instructions to cause the processor to perform the acts comprising resetting the registration timer.

13. The core access node of the mobile network of claim 10, wherein the computer-executable instructions further comprise instructions to cause the processor to perform the acts comprising:
   determining that the third-party device has not been used on the mobile network within a period of time prior to the registration timer reaching the refresh point; and
   in response to determining that the third-party device has not been used on the mobile network within a period of time prior to the registration timer reaching the refresh point:
      transmitting a refresh registration message to the third-party device;
      waiting a period of time to receive a response from the third-party device in response to transmitting the refresh registration message to the third-party device;
      if the response from the third-party device in response to transmitting the refresh registration message to the third-party device is not received within a response time limit, de-registering the third-party device and ending the refresh operation; and
      if the response from the third-party device in response to transmitting the refresh registration message to the third-party device is received within a response time limit, re-registering the third-party device and ending the refresh operation.

14. The core access node of the mobile network of claim 10, wherein the identification comprises a clientID and a sessionID.

15. The core access node of the mobile network of claim 10, wherein the computer-executable instructions further comprise instructions to cause the processor to perform the acts comprising:
   translating a Hypertext Transfer Protocol over Secure Socket Layer message received from the agent application to a Session Initial Protocol message to be sent to an Internet Protocol Multimedia Subsystem (IMS) core of the mobile network; and
   translating an SIP message received from the IMS core to an HTTPS message to be sent to the agent application.

16. A third-party device, comprising:
   memory storing computer-executable instructions; and
   a processor in communication with at least the transceiver and the memory, the computer-executable instructions causing the processor to perform acts comprising:
      sending a request to a core access node to allow use of a third-party device on a mobile network by using at least one telephone line of a plurality of telephone lines assigned to a user account as part of a user subscription to the mobile network;
      receiving a message from the core access node to validate an access token;
      sending a validation message to the core access node that the access token is valid;
      receiving an identification from the core access node, the identification to be used by the third-party device to communicate with the mobile network; and
      receiving a notification that the device is registered to use the mobile network.

17. The third-party device of claim 16, wherein the computer-executable instructions further comprise instructions to cause the processor to perform the acts comprising:
   receiving a notification from the core access node to refresh a registration of the third-party device; and
   requesting that the core access node refresh the registration; and
   receiving a notification from the core access node that the registration has been refreshed.

18. The third-party device of claim 16 wherein the identification comprises a clientID and a sessionID.

19. The third-party device of claim 18, wherein the clientID and the sessionID are provided to the core access node to identify the third-party device.

20. The third-party device of claim 16, wherein the computer-executable instructions further comprise instructions to cause the processor to perform the acts comprising receiving a request to provide a list of capabilities of the third-party device, wherein the list of capabilities comprises audio capabilities, video capabilities, or network communication capabilities.

* * * * *